United States Patent
Chan et al.

(10) Patent No.: US 7,401,239 B2
(45) Date of Patent: Jul. 15, 2008

(54) INTERNAL POWERLINE POWER SUPPLY METHOD AND SYSTEM

(75) Inventors: Tat Keung Chan, South San Francisco, CA (US); Songly Mu, Salida, CA (US)

(73) Assignee: Asoka USA Corporation, Foster City, CA (US)

( * ) Notice: Subject to any disclaimer, the term of this patent is extended or adjusted under 35 U.S.C. 154(b) by 89 days.

(21) Appl. No.: 11/219,029

(22) Filed: Sep. 2, 2005

(65) Prior Publication Data

US 2006/0193110 A1   Aug. 31, 2006

Related U.S. Application Data

(60) Provisional application No. 60/607,383, filed on Sep. 3, 2004.

(51) Int. Cl.
*G06F 1/26* (2006.01)
(52) U.S. Cl. .................................. 713/300; 340/310.01
(58) Field of Classification Search ................... 713/300
See application file for complete search history.

(56) References Cited

U.S. PATENT DOCUMENTS

| | | | | |
|---|---|---|---|---|
| 4,860,185 | A | * | 8/1989 | Brewer et al. .................. 363/41 |
| 5,835,005 | A | * | 11/1998 | Furukawa et al. ........... 370/400 |
| 6,014,386 | A | * | 1/2000 | Abraham ..................... 370/485 |
| 6,057,812 | A | * | 5/2000 | Arai et al. ..................... 345/10 |
| 6,130,896 | A | | 10/2000 | Lueker et al. |
| 6,188,557 | B1 | | 2/2001 | Chaudhry |
| 6,243,413 | B1 | | 6/2001 | Beukema |
| 6,363,449 | B1 | * | 3/2002 | Sides et al. .................. 710/100 |
| 6,373,377 | B1 | * | 4/2002 | Sacca et al. .................. 375/257 |

(Continued)

FOREIGN PATENT DOCUMENTS

DE    100 59564 A1    9/2000

(Continued)

OTHER PUBLICATIONS

Evans; "The CEBus Standard User'Guide, The Training Department Publications, May 1996."

*Primary Examiner*—Chun Cao
(74) *Attorney, Agent, or Firm*—Townsend and Townsend and Crew, LLP

(57) ABSTRACT

A power supply apparatus and related method. The power supply apparatus has an AC input. The apparatus has a converter for converting AC power into DC power. In a specific embodiment, the converter has an input and an output. In a specific embodiment, the input of the converter is coupled to the AC input. The power supply apparatus has a DC output for voltage ranging. The output of the converter is coupled to the DC output. The apparatus also has a fan operably configured to transfer thermal energy away from the converter and a data input/output port, the data input/output port being coupled to a data signal from a data source. The apparatus has a coupler coupled between the data input/output port and the AC input. A power line module is coupled to the coupler. The power line module is adapted to convert the data signal from a first format to a second format. The second format is capable of transmission to the AC input. An enclosure is provided for the coupler. The enclosure shields the data signal from noise, e.g., high frequency noise, low frequency noise.

35 Claims, 12 Drawing Sheets

U.S. PATENT DOCUMENTS

| | | | |
|---|---|---|---|
| 6,388,564 | B1 | 5/2002 | Piercy et al. |
| 6,496,103 | B1 * | 12/2002 | Weiss et al. ................. 375/257 |
| 6,496,105 | B2 * | 12/2002 | Fisher et al. ................ 375/258 |
| 6,560,319 | B1 | 5/2003 | Binder |
| 6,668,058 | B2 | 12/2003 | Grimes |
| 6,668,328 | B1 * | 12/2003 | Bell ........................... 713/300 |
| 6,757,368 | B2 | 6/2004 | Binder |
| 6,759,946 | B2 | 7/2004 | Sahinoglu et al. |
| 6,775,121 | B1 | 8/2004 | Chaudhry |
| 6,842,459 | B1 | 1/2005 | Binder |
| 6,885,674 | B2 | 4/2005 | Hunt et al. |
| 6,904,134 | B2 | 6/2005 | Jeon et al. |
| 6,927,340 | B1 | 8/2005 | Binder et al. |
| 6,934,862 | B2 * | 8/2005 | Sharood et al. ............. 713/300 |
| 6,947,409 | B2 | 9/2005 | Iwamura |
| 6,958,680 | B2 | 10/2005 | Kline |
| 6,965,302 | B2 | 11/2005 | Mollenkopf et al. |
| 6,989,734 | B2 * | 1/2006 | Thomas ..................... 375/258 |
| 7,007,305 | B2 | 2/2006 | Carson et al. |
| 7,133,278 | B2 * | 11/2006 | Amdahl et al. ............. 361/679 |
| 7,136,936 | B2 | 11/2006 | Chan et al. |
| 2002/0014972 | A1 | 2/2002 | Danielson et al. |
| 2004/0001440 | A1 | 1/2004 | Kostoff, II et al. |
| 2004/0125870 | A1 | 7/2004 | Yamazaki |
| 2004/0153543 | A1 * | 8/2004 | Thomas ..................... 709/225 |
| 2005/0102048 | A1 * | 5/2005 | Anderson et al. ............. 700/94 |

FOREIGN PATENT DOCUMENTS

| | | |
|---|---|---|
| DE | 100 08602 A1 | 6/2001 |
| DE | 100 12235 C2 | 12/2001 |
| DE | 100 47648 A1 | 4/2002 |
| DE | 101 0353 A1 | 8/2002 |
| DE | 101 19039 A1 | 12/2002 |
| DE | 10119040 A1 | 12/2002 |
| DE | 100 42958 C2 | 1/2003 |
| EP | 0 822 721 A2 | 2/1998 |
| EP | 1 043 866 A2 | 10/2000 |
| EP | 1 251 646 A2 | 10/2002 |
| WO | WO 01/63787 A1 | 8/2001 |
| WO | WO 02/37712 A1 | 5/2002 |

\* cited by examiner

PIN ASSIGNMENT:

| P1 | COLOR | P2 | FUNCTION |
|---|---|---|---|
| 1 | RED | 2 | +5V (FUSED) |
| 2 | WHITE | 4 | FNT_USBP0# |
| 3 | GREEN | 6 | FNT_USBP0 |
| 4 | BLACK | 8 | GROUND |
| 5 | DRAIN + BD | 8 | GROUND |

| FUNCTION | P2 | COLOR | P3 |
|---|---|---|---|
| +5V(FUSED) | 1 | RED | 1 |
| FNT_USBP1# | 3 | WHITE | 3 |
| FNT_USBP1 | 5 | GREEN | 5 |
| GROUND | 7 | BLACK | 7 |
| N.C | 10 | | 10 |
| KEY | 9 | | |

INTERNAL POWERLINE POWER SUPPLY METHOD AND SYSTEM

CROSS-REFERENCES TO RELATED APPLICATIONS

The present application relates to U.S. Ser. No. 60/607,383 filed Sep. 3, 2004, commonly assigned, and hereby incorporated by reference for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates generally to power line networking techniques. More particularly, the invention provides a method and system for a high speed power line network using integrated power line modules in a power supply for a computing environment. Merely by way of example, the invention has been applied in a local area network environment, but it would be recognized that other applications exist. The invention can also be applied to building area networking, home networking, office networking, apartments, any combination of these, and other networking applications.

Telecommunication techniques have been around for numerous years. In the early days, a communication technique known as telegraph was developed. Telegraph generally transferred information from one geographical location to another geographical location using electrical signals in the form of "dots" and "dashes" over transmission lines. An example of commonly used electrical signals is Morse code. Telegraph has been, for the most part, replaced by telephone. The telephone was invented by Alexander Graham Bell in the 1800s to transmit and send voice information using electrical analog signals over a telephone line, or more commonly a single twisted pair copper line. Most industrialized countries today rely heavily upon telephone to facilitate communication between businesses and people, in general.

In the 1990s, another significant development in the telecommunication industry occurred. People began communicating to each other by way of computers, which are coupled to the telephone lines or telephone network or other communication network. These computers or workstations coupled to each other can transmit many types of information from one geographical location to another geographical location. In general, there has been various types of computer networks, including local area networks, commonly called LANs, and wide are networks, commonly called WANs.

Local area networks have been used to connect computers in a smaller geographic region than wide area networks. Most local area networks rely upon dedicated cables to transmit the communication signals through the network. An alternative way of transmitting such communication signals through non-dedicated cables but through a power supply network is referred to as Power line Communication, commonly called PLC. Power line communication relies upon pre-existing power lines that are used to supply electrical power distributed through buildings, such as homes and office structures. Conventional PLC relies upon radio frequency technologies. Although power line communications have been successful in part, many limitations still exist.

For example, power line communication generally has limited capability due to lack of infrastructure. That is, power line networking has not been "mainstream," Power line networking has little or almost no infrastructure. Additionally, power line network devices are lacking and simply do not exist on a wide scale. In conventional office settings in the United States, power line networking is absent and almost non-existent. These and other limitations have been described throughout the present specification and more particularly below.

From the above, it is seen that improved techniques for power line networks are highly desired.

BRIEF SUMMARY OF THE INVENTION

According to the present invention, techniques for power line networking techniques are provided. More particularly, the invention provides a method and system for a high speed power line network using integrated power line modules in a power supply for a computing environment. Merely by way of example, the invention has been applied in a local area network environment, but it would be recognized that other applications exist. The invention can also be applied to building area networking, home networking, office networking, apartments, any combination of these, and other networking applications.

In a specific embodiment, the present invention provides a power supply apparatus. The power supply apparatus has an AC input for voltage ranging from about 120 volts to about 240 volts and frequency ranging from about 60 to about 50 Hertz according to a specific embodiment. The apparatus has a converter for converting AC power into DC power. In a specific embodiment, the converter has an input and an output. In a specific embodiment, the input of the converter is coupled to the AC input. The power supply apparatus has a DC output for voltage ranging from about 12 volts, 5 volts, 3.3 volts, 2.5 volts, and others according to an embodiment of the present invention. The output of the converter is coupled to the DC output. The apparatus also has a fan operably configured to transfer thermal energy away from the converter. The apparatus has a data input/output port, which is coupled to a data signal from a data source. The apparatus has a coupler (which couples telecommunication signals to and from a powerline) coupled between the data input/output port and the AC input. A power line module is coupled to the coupler. The power line module is adapted to convert the data signal from a first format to a second format. The second format is capable of transmission to the AC input. An enclosure is provided for the coupler. The enclosure shields the data signal from noise, e.g., high frequency noise, low frequency noise.

In an alternative specific embodiment, the present invention provides a personal computing apparatus, e.g., personal computer, laptop computer, set top box, Internet appliance. The apparatus has a personal computer housing. In a specific embodiment, the personal computer housing is coupled to an AC input interface and a data input/output interface. The apparatus also has a power supply apparatus within the personal computer housing. In a specific embodiment, the power supply apparatus has an AC input coupled to the AC input interface. In a specific embodiment, the AC input for voltage ranges from about 120 volts to about 240 volts and frequency ranging from about 60 to about 50 Hertz according to a specific embodiment. A converter for converting AC power into DC power is coupled to the AC input. The converter has an input and an output. The supply apparatus has a DC output for voltage ranging from about 12 volts, 5 volts, 3.3 volts, 2.5 volts, and others according to an embodiment of the present invention. The output of the converter is coupled to the DC output. A fan is operably configured to transfer thermal energy away from the converter. The apparatus has a data input/output interface, which is coupled to the data input/output interface. In a specific embodiment, the data input/output interface is coupled to a data signal in a first format from a data source. A coupler is coupled between the data input/output port and the AC input. The power supply apparatus also has a power line module coupled to the coupler. In a preferred embodiment, the power line module is adapted to convert the data signal from the first format to a second format, which is capable of transmission to the AC input interface. The power supply apparatus also has an enclosure provided for the coupler. In a preferred embodiment, the enclosure is adapted to shield the data signal.

In yet an alternative specific embodiment, the invention provides a power supply apparatus. The power line apparatus has an AC input for voltage. A converter for converting AC power into DC power is included. The converter comprises an input and an output. A DC output for voltage ranging from about a first determined amount to about a second determined amount is provided. A data input/output port is included. In a preferred embodiment, the data input/output port is coupled to a data signal from a data source via USB (universal serial bus), Parallel Bus. A coupler is coupled between the data input/output port and the AC input. A housing member is coupled to the coupler. In a preferred embodiment, the housing member has a first side and a second side, which is coupled to the coupler. A power line module is coupled to the coupler. The power line module is provided on the first side of the housing member. The power line module is adapted to convert the data signal from a first format to a second format, which is capable of transmission to the AC input. In a preferred embodiment, the power line module is separated (physically and spatially) from the coupler by the housing member. An enclosure is provided for the power line module. In a preferred embodiment, the enclosure is provided to shield the power line module from a high frequency noise.

In a specific embodiment, the present invention provides a method for powerline communications using a power supply module. The method includes providing a telecommunication signal in a first format from an input/output port, which can be a USB port or other like port. The method includes converting the powerline signal in the first format to a second format using a power line module coupled to a first side of a housing member, which is for a power supply of, for example, a PC or other like device. The method includes transferring the powerline signal in the second format through a portion of the housing using a flexible cable. The method includes coupling the powerline signal in the second format to an AC powerline using a coupling device coupled to a second side of the housing member.

In a specific embodiment, the present apparatus includes a first board and a second board. The first board corresponds to a digital board and the second board corresponds to a coupling board, which couples data signals to an AC power line network. As merely an example, the digital board includes as an example only, an Intellon INT5200 high-speed power line communications (PLC) chip, but can be others. The chip is configured as a Universal Serial Bus ("USB") device and derives power from the USB port inside the PC motherboard. The chip also receives telecommunication signals from the USB port according to a specific embodiment. The digital board is enclosed in a metal housing which is mounted on the side of the power supply unit (PSU) housing and the PLC signal is connected to the coupling board through a short cable, which is shielded and flexible, according to a specific embodiment. In a specific embodiment, the coupling board couples the PLC signal from the digital board to the AC power cord. The components on this coupling board are often all passive components according to a specific embodiment. In a preferred embodiment, the passive components are often carefully selected to comply with safety and electromagnetic interference considerations, commonly termed EMI. Each of these passive components should also be carefully placed on the coupling board to get maximum and/or desired connectivity to the AC power cord. In a specific embodiment, the coupling board is mounted inside the power supply unit, while the digital board is mounted outside of the power supply unit and separated by a housing member.

One or more benefits can be achieved using the present invention over conventional techniques. The present invention can be applied using conventional components from computer networking and hardware technologies. Additionally, the invention can be applied to pre-existing power line structures without substantial modification. Preferably, the present system and method are easy to implement and also allows for power line networking capabilities to be embedded on a personal computing device, such as a personal computer or the like, according to a specific embodiment. Additionally, the present power line enabled power supply has the same and/or similar form factor as conventional power supplies and can be provided into a personal computing environment without any substantial modifications according to a preferred embodiment.

Other benefits maybe achieved using one or more embodiments of the present invention. In a specific embodiment, the present apparatus and method provides an integrated home network solution for a desktop personal computer (PC). Embedding a power line module into a desktop PC power supply, present apparatus and method enables an integrated desktop PC, including power line capabilities according to a specific embodiment. In a preferred embodiment, the present apparatus allows for instant networking of a desktop PC simply by plugging in and using the same power cord cable to power up the machine. In a preferred embodiment, the present apparatus provides for a home networking environment that is seamless and transparent for the average user. In a specific embodiment, the present method provides for plugging a desktop PC to a regular electrical outlet to enable the PC with power line local area networking (LAN). In a specific embodiment using Orthogonal Frequency Division Multiplexing (OFDM) modulation technology, the present apparatus and method offer a reliable network solution by: (a) sending data through an operating frequency of 4-21 MHz which is much higher than standard household appliances; and (b) allowing data to be transmitted through eight-four (84) different channels. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIG. 8 is a simplified diagram of a cable for interfacing the digital board of FIG. 7 to a mother board according to an embodiment of the present invention;

DETAILED DESCRIPTION OF THE INVENTION

According to the present invention, techniques for power line networking techniques are provided. More particularly, the invention provides a method and system for a high speed power line network using integrated power line modules in a power supply for a computing environment. Merely by way of example, the invention has been applied in a local area network environment, but it would be recognized that other applications exist. The invention can also be applied to building area networking, home networking, office networking, apartments, any combination of these, and other networking applications.

Figure 1:
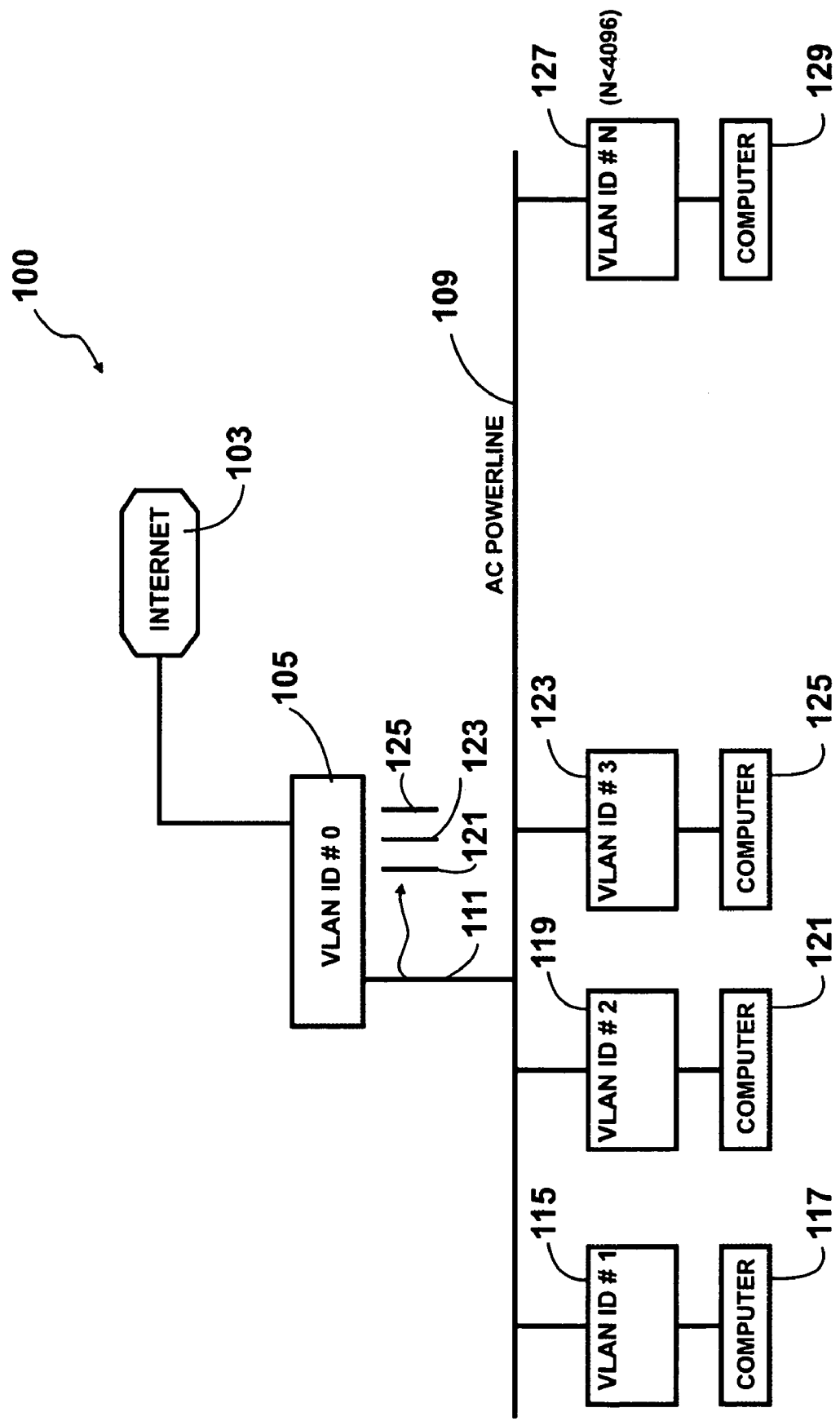
FIG. 1 is a simplified diagram of a power line system according to an embodiment of the present invention.

FIG. 1 is a simplified diagram of a power line system according to an embodiment of the present invention. This diagram is merely an example, which should not unduly limit the scope of the claims herein. One of ordinary skill in the art would recognize many variations, alternatives, and modifications. As shown, the system 100 for power line networking is included. The system 100 has an external data source 103, which is derived from a world wide networks of computers. As merely an example, the data source can be the Internet or other like entity. The system includes a first power line 121, a second power line 123, and a third power line 125, each of which corresponds to a phase. Each of the power lines is often bundled together and represented by reference numeral 111.

Referring again to FIG. 1, the system includes a gateway 115 coupled between the data source and an AC power line 109 according to a specific embodiment. The AC power line couples to a plurality of bridge devices 115, 119, 123, 127 numbered from 1 through N, where N is an integer greater than 2, according to a specific embodiment. Each of the bridge devices is coupled to a client device 117 or a plurality of client devices to define a "segment" on the power line network. As shown, bridge device 119 couples to client device 121. Bridge device 123 couples to client device 125. Bridge device 127 couples to client device 129. Depending upon the specific embodiment, the client device can be a personal computer, a wireless device, a lap top computer, an Internet phone, an Internet appliance (e.g., refrigerator, stereo, television set, clock, digital paintings), any combinations of these, and others. Of course, one of ordinary skill in the art would recognize. Further details of the gateway and bridge device can be found throughout the present specification and more particularly below.

Figure 2:
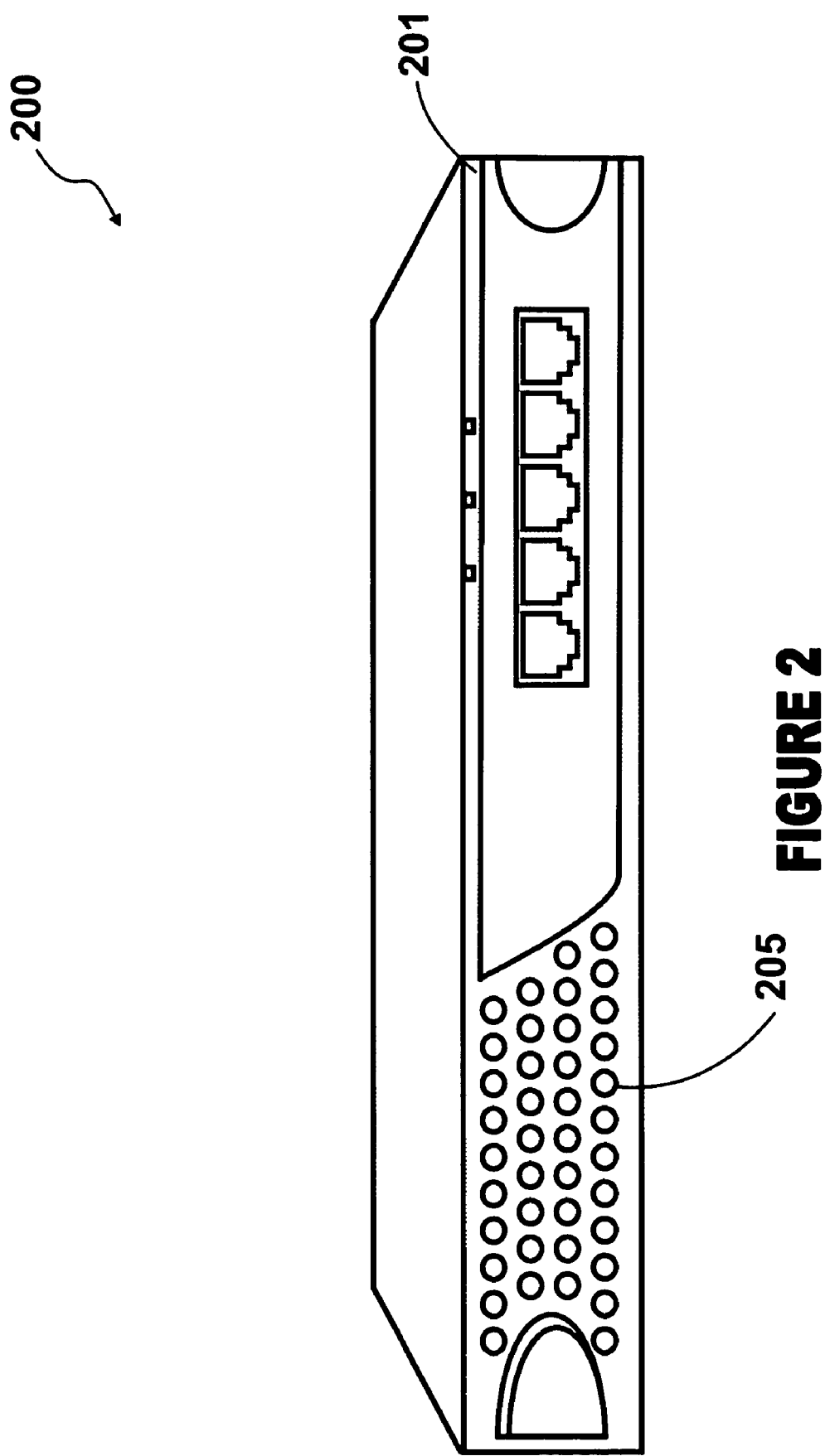
FIG. 2 is a simplified diagram of a power line gateway system according to an embodiment of the present invention.

FIG. 2 is a simplified diagram of a power line gateway system 200 according to an embodiment of the present invention. This diagram is merely an example, which should not unduly limit the scope of the claims herein. One of ordinary skill in the art would recognize many variations, alternatives, and modifications. As shown, the gateway system 200 has a housing 201 including at least three input/output ports 205, which can be coupled to external power lines according to a specific embodiment. In a specific embodiment, one or more power line signals is derived from the housing.

In a preferred embodiment, the power line signal coupled to each of the three input/output ports. That is, the power line signal is injected directly into each of the phases. In a specific embodiment, the present power line signal is injected directly into each of the phases, where the phases are not coupled to each other upon injection according to a specific embodiment. The three input/output ports include a first phase input/output port coupled to the first power line, a second phase input/output port coupled to the second power line, and a third input/output port coupled to the third power line. Of course, there can be other variations, modifications, and alternatives. Further details of the gateway system can be found throughout the present specification and more particularly below.

Figure 3:
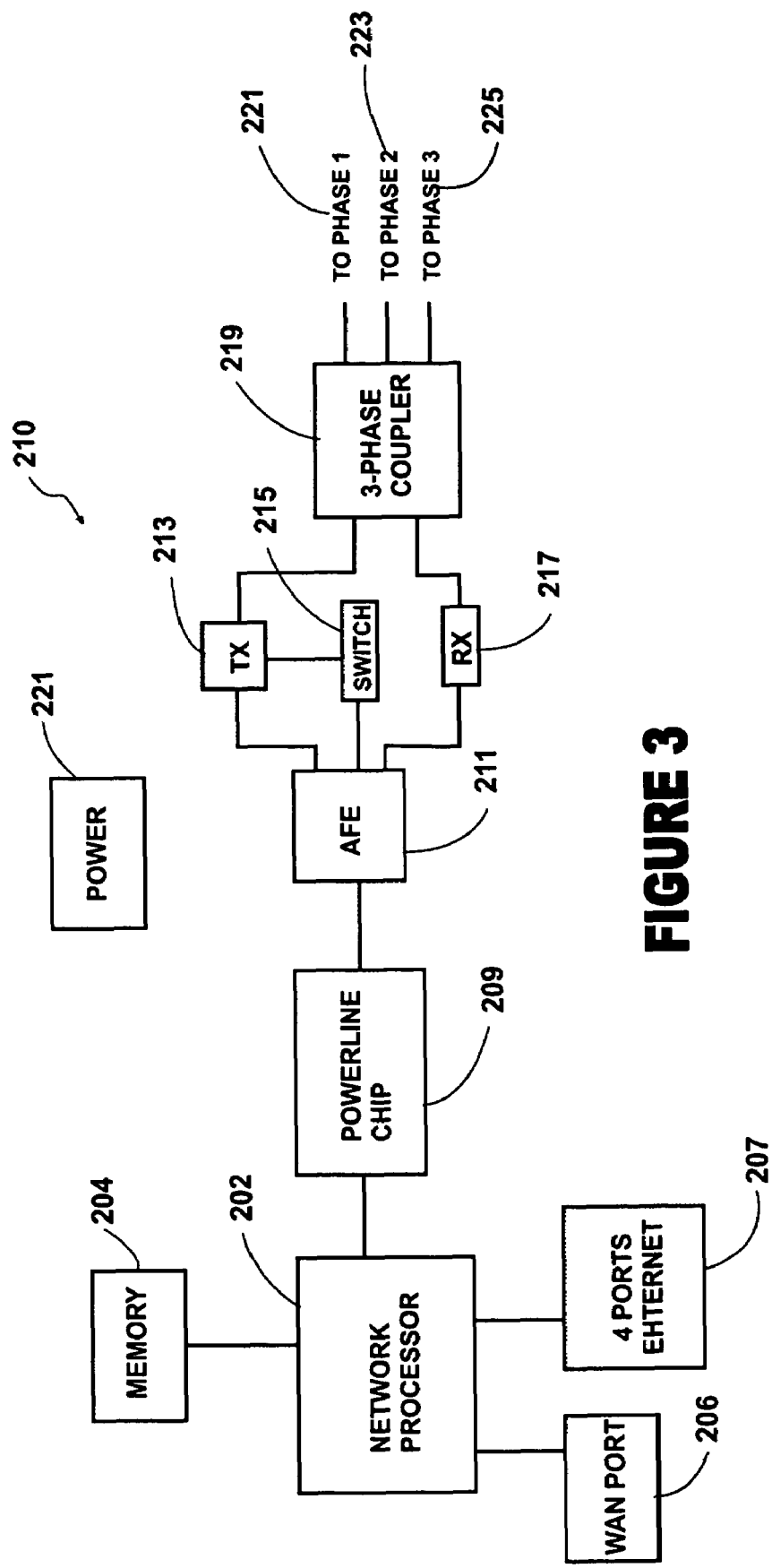
FIG. 3 is a simplified block diagram of the power line gateway system of FIG. 2 according to a specific embodiment.

FIG. 3 is a simplified block diagram 210 of the power line gateway system of FIG. 2 according to a specific embodiment. This diagram is merely an example, which should not unduly limit the scope of the claims herein. One of ordinary skill in the art would recognize many variations, alternatives, and modifications. As shown, the system has a network processor 202 within the housing and coupled to the power line signal via power line chip 209. In a specific embodiment, the network processor includes a network connector input/output port 206 coupled the network processor and coupled to the housing. In a preferred embodiment, the input/output port 206 couples to a data network, which couples to a wide area network and/or world wide area network, as noted. The network processor also includes one or more input/output ports for one or more local area networks 207. The network processor has an interface to a memory device 204, which can include a dynamic random access memory, static random access memory, or other types, depending upon the specific embodiment. As merely an example, the network processor can be any suitable type such as the ADM5120 Series manufactured by Infineon Technologies AG of Germany, but can also be others. In a specific embodiment, the system also has a power module 221, which provides suitable power (e.g., voltage/current) to each of the elements described herein. Of course, one of ordinary skill in the art would recognize other variations, modifications, and alternatives.

In a preferred embodiment, the system has the power line chip 209, called herein "PLC" chip, which is coupled between the network processor and analog front end 211 device. As shown, the PLC is coupled to the analog front end (AFE) module 211. The AFE module interfaces between the chipset and a three phase coupler 219 according to a specific embodiment. Between the AFE and coupler is transmit 213 and receive 217 devices according to a specific embodiment. A switching device couples to the AFE chip and transmit device according to a specific embodiment. Further details of the power line chip, AFE, TX/RX devices, and coupler are provided throughout the present specification and more particularly below.

In a specific embodiment, the power line device can be any suitable power line integrated circuit chips and/or chip sets. As merely an example, the power line chip is an integrated circuit chip sold under part number 5500CS manufactured by INTELLON CORPORATION of Florida. Here, the chip can be a single-chip power line networking controller with integrated MII/GPSI, USB. The chip interfaces with Ethernet interfaces, among others. Preferably, there is at least a 80 Mbps data rate on the power line, although others may desirable. Additional features include an Integrated 10-bit ADC, 10-bit DAC and AGC, a selectable MDI/SPI PHY management interface, general purpose 8-wire serial PHY data interface. Preferably, the signal processing uses Orthogonal Frequency Division Multiplexing (OFDM) for high data reliability, as well as adaptive channel characterization, Viterbi and block coding. In alternative embodiments, the power line device can also include other chip designs that are suitable for the present methods and systems. Of course, one of ordinary skill in the art would recognize other variations, modifications, and alternatives.

In a specific embodiment, the three phase coupler can be any suitable device capable of injecting power line signals directly into each of the three phases 221, 223, 225 independently. In a specific embodiment, the coupler can be an inductive coupler and/or capacitive coupler, but may be others. In a preferred embodiment, each of the three phases receives/transmits power line signals directly (and are not coupled to each other at the gateway or within a vicinity of the gateway) to more efficient signal transfer and receive processes. As merely an example, the coupler can be either inductive and/or capacitive, but can be others. As noted, the three phase coupler is merely an example and should not unduly limit the scope of the claims herein.

Figure 4:
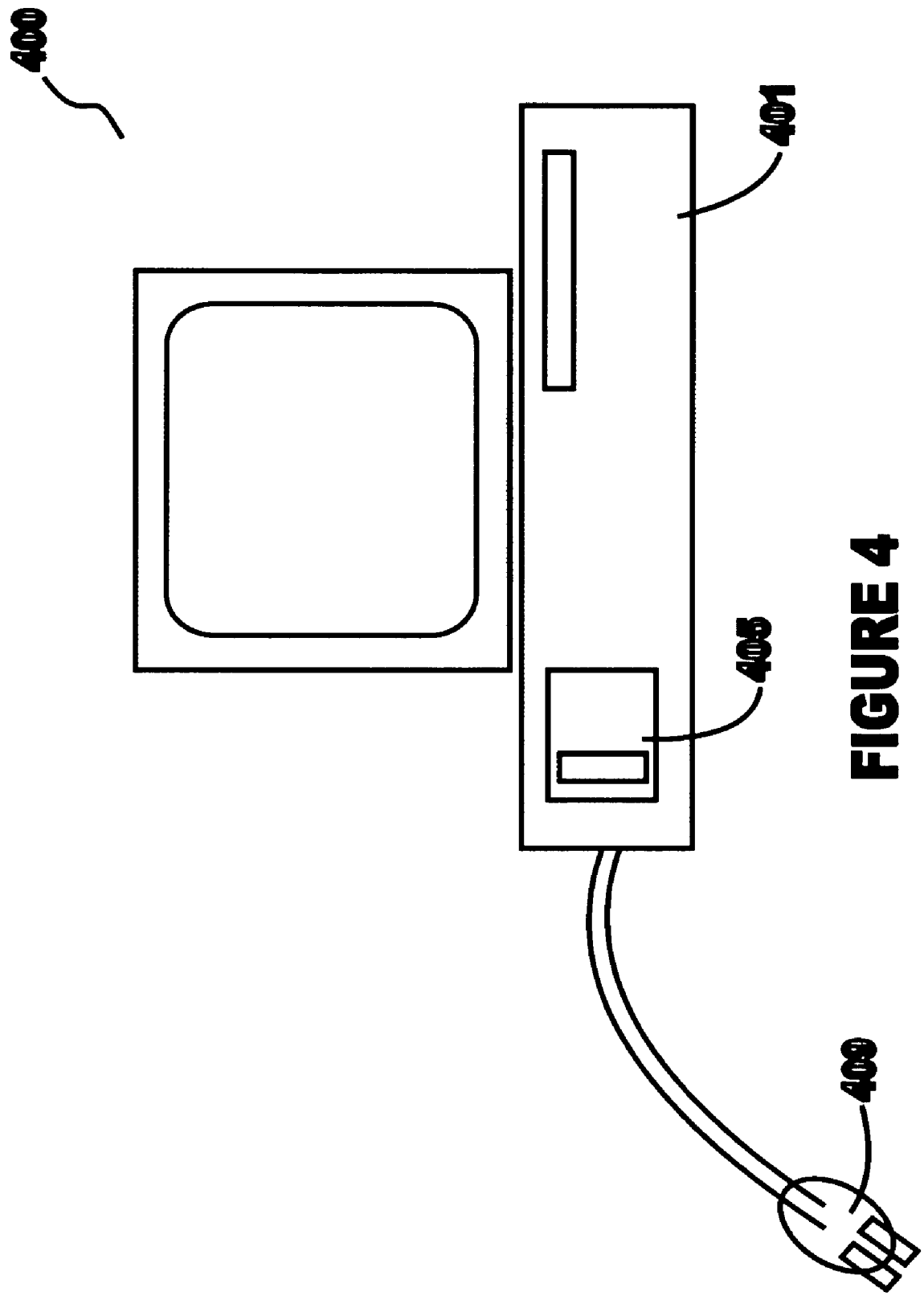
FIG. 4 is a simplified diagram of a computer system including a power supply according to an embodiment of the present invention.

FIG. 4 is a simplified diagram of a computer system 400 including a power supply according to an embodiment of the present invention. This diagram is merely an example, which should not unduly limit the scope of the claims herein. One of ordinary skill in the art would recognize many variations, alternatives, and modifications. As shown, the computer system 400 includes a housing 401, which is often metal and/or plastic according to a specific embodiment. The housing includes a power supply 405 for providing DC power to a variety of elements to power the various components, including a microprocessor, memory devices, hard disk drive, controllers, and other integrated circuit device elements and/or components. The power supply includes a power supply module embedded within the power supply according to a preferred embodiment. The power supply is coupled to power cord 409, which includes both power line and telecommunication capabilities according to a specific embodiment. Although the present apparatus is provided in a personal computer, other devices (e.g., Internet appliance, electronic systems and/or devices) can also be used. Further details of the present power supply can be found throughout the present specification and more particularly below.

Figure 5:
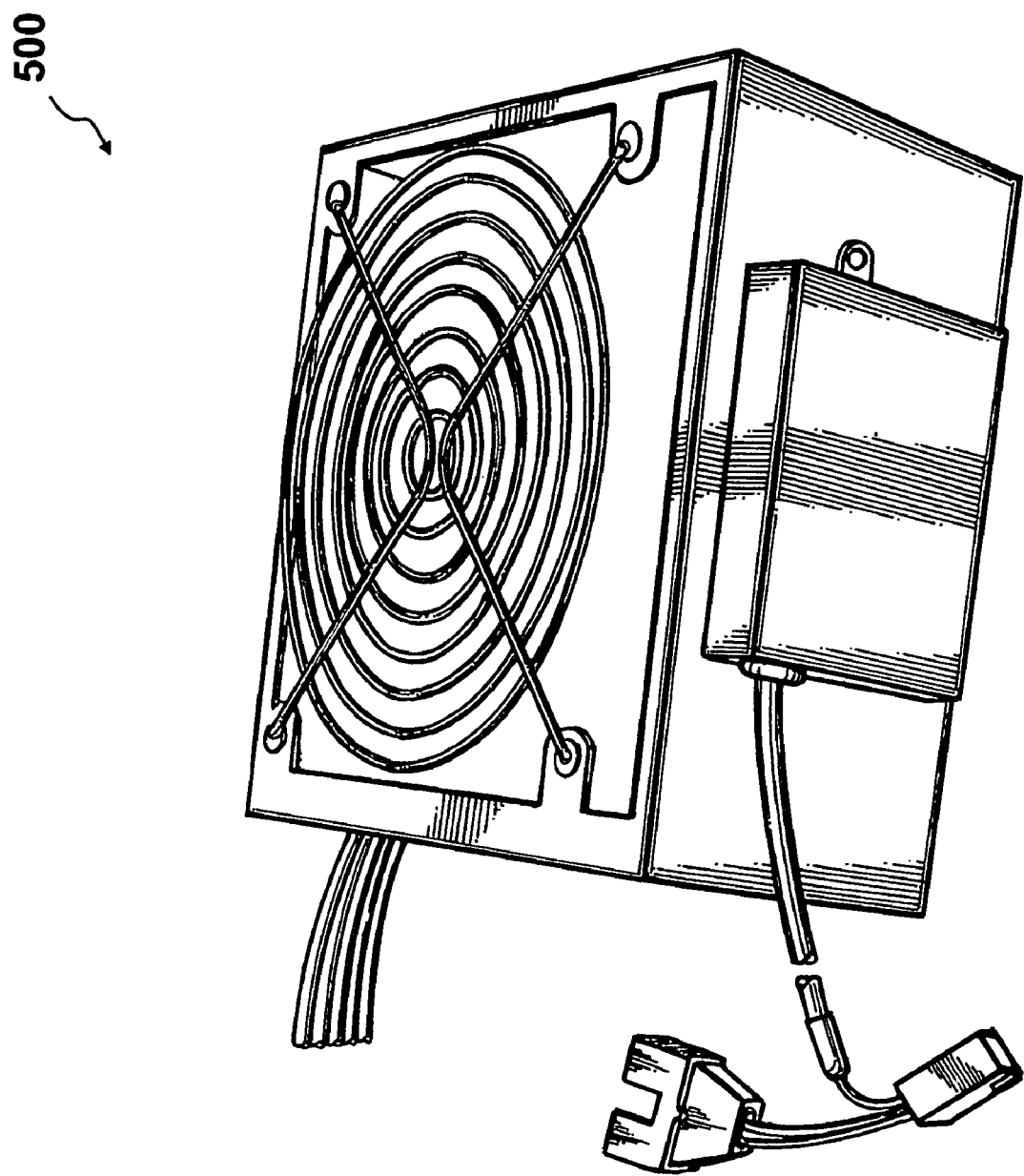
FIG. 5 is a simplified diagram of a power supply with embedded power supply module according to an embodiment of the present invention.

FIG. 5 is a simplified diagram of a power supply with embedded power supply module according to an embodiment of the present invention. This diagram is merely an example, which should not unduly limit the scope of the claims herein. One of ordinary skill in the art would recognize many variations, alternatives, and modifications. As shown, the power supply includes a housing and fan to remove thermal energy in the form of heat from one or more components therein. In a specific embodiment, the housing has a length of about one foot and less, a width of about six inches and less, and a height of about six inches and less, but can be others. In a specific embodiment, the housing dimensions are merely examples to illustrate a particular size of a housing for PC applications, but can be other dimensions depending upon the application, among other factors. The housing is also made of a suitable material such as plastic, sheet metal, and/or combinations of these materials and can be provided in a rack or other suitable location according to a specific embodiment. The housing is also often vented with a plurality of openings in certain regions according to a specific embodiment. Details of the embedded power supply module are provided throughout the present specification and more particularly below.

Figure 6:
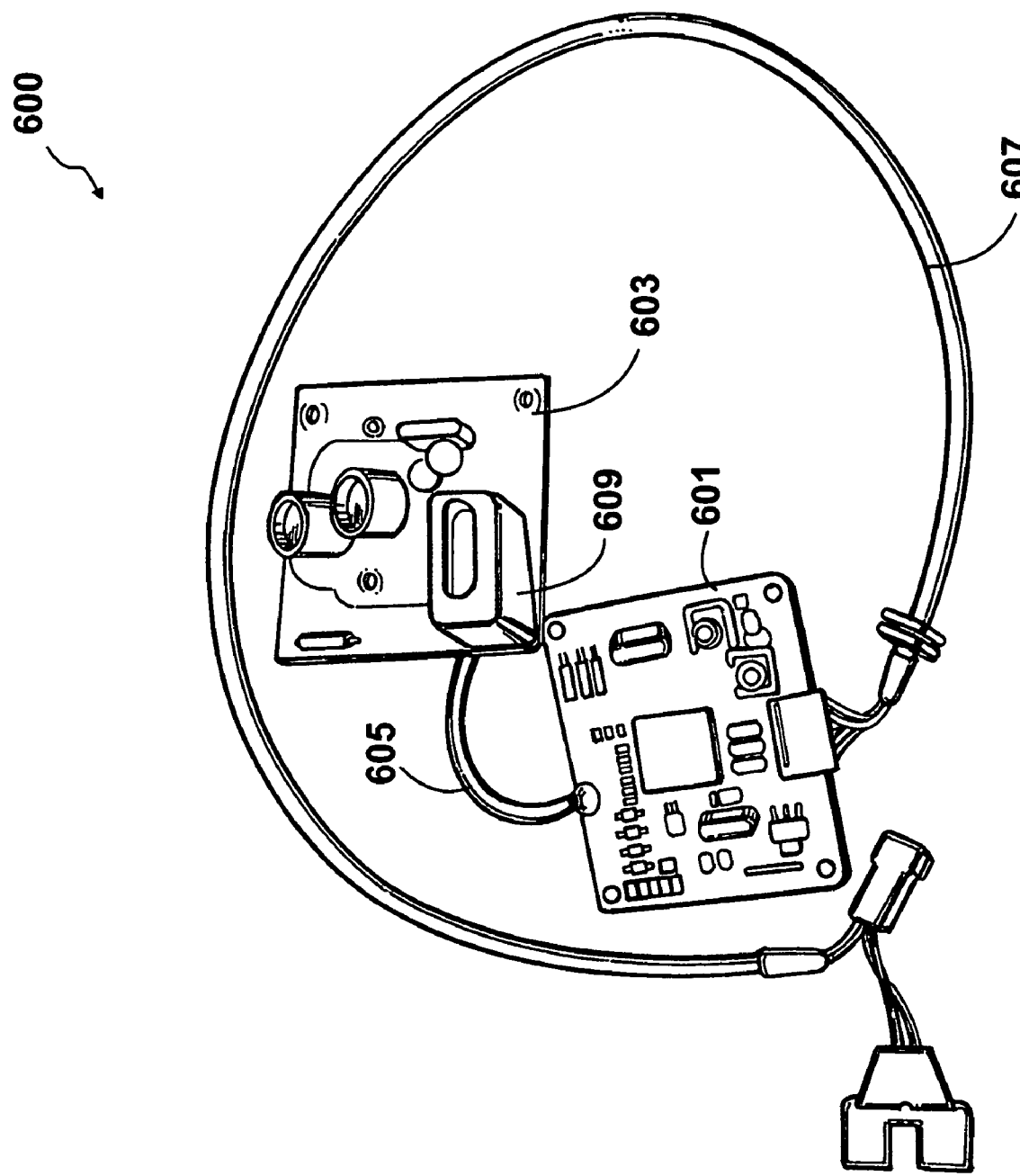
FIG. 6 is a simplified diagram of a coupling board and a digital power supply module board according to an embodiment of the present invention.

FIG. 6 is a simplified diagram of a coupling board 603 and a digital power supply module board 601 according to an embodiment of the present invention. This diagram is merely an example, which should not unduly limit the scope of the claims herein. One of ordinary skill in the art would recognize many variations, alternatives, and modifications. As shown, the present power line apparatus has two main boards: the digital board 601, and the coupling board 603, among other elements. As shown, the digital board and the coupling board are connected with a flexible cable of a certain length of about three inches or less or one inch or less according to a specific embodiment. In a preferred embodiment, the cable is flexible so that the digital board can be mounted on a first portion of the housing and the coupling board can be mounted on a second portion of the housing. Additionally, the flexible cable allows for compliance and reliability during shipping, etc., and does not cause breakage of joints between the cable and portions of the boards. Of course, there can be other variations, modifications, and alternatives.

In a specific embodiment, the digital board includes a power line module among other features. As merely an example, the digital board includes a power line chip, such as the Intellon INT5200 high-speed power line communication (PLC) chip, but can be others. In a specific embodiment, the power line chip is configured as a USB device and derives power from the USB port inside the PC motherboard via cable 607. The digital board is enclosed in a metal housing which is mounted outside of the power supply unit (PSU) and the power line communication signal is connected to the coupling board through a short cable 605 according to a specific embodiment.

Figure 6A:
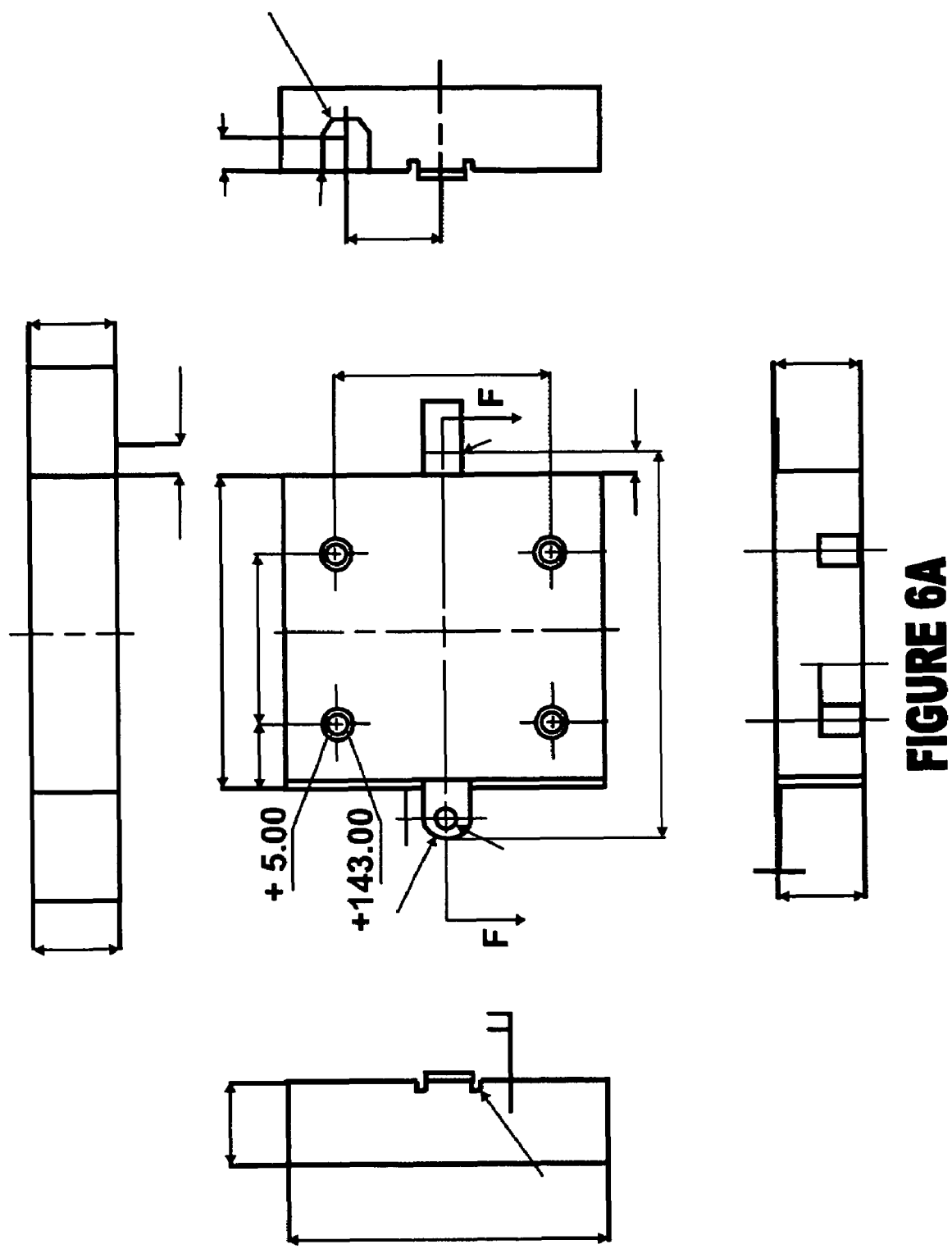
FIG. 6A is a simplified diagram of a housing for a digital board according to an embodiment of the present invention.

Referring to FIG. 6A, the digital board is assembled in a metal housing prior to mounting to the power supply unit according to an embodiment of the present invention. In a specific embodiment, a mechanical drawing of the metal housing is shown. The metal housing can shield one or more components from noise and other undesirable influences according to a specific embodiment. Of course, there can be other variations, modifications, and alternatives.

In a specific embodiment, the apparatus also has a coupling board 605. The coupling board includes various elements that couple the power line communication signal to the AC power cord. In a specific embodiment, the components on this board are generally all passive components, but there can be others. The passive components are often carefully selected to comply with safety and electromagnetic interference requirements. In a specific embodiments, the passive components are often carefully placed to get maximum connectivity for the power line communication signal. In a preferred embodiment, the coupling board is mounted inside the power supply apparatus, which is commonly termed power supply unit according to certain embodiments.

In a preferred embodiment, various components are metal shielded 609 on the coupling board. As the signal of power line chip is very susceptible to radio frequency ("RF") noise, the AC wires must often be pushed away from the metal shield of the coupling transformer. Keeping the AC wires away from the coupling transformer provides a better power line communication data throughput. Additionally, we should also suppress the EMI noise as well. To successfully suppress the EMI noise, we place a ferrite core on the AC wires between the coupling board and the AC socket according to a specific embodiment. As merely an example, the ferrite core is sold under part number CTRC-0813 from Core-Tech, but can be others. Of course, there can be other variations, modifications, and alternatives.

Figure 6B:
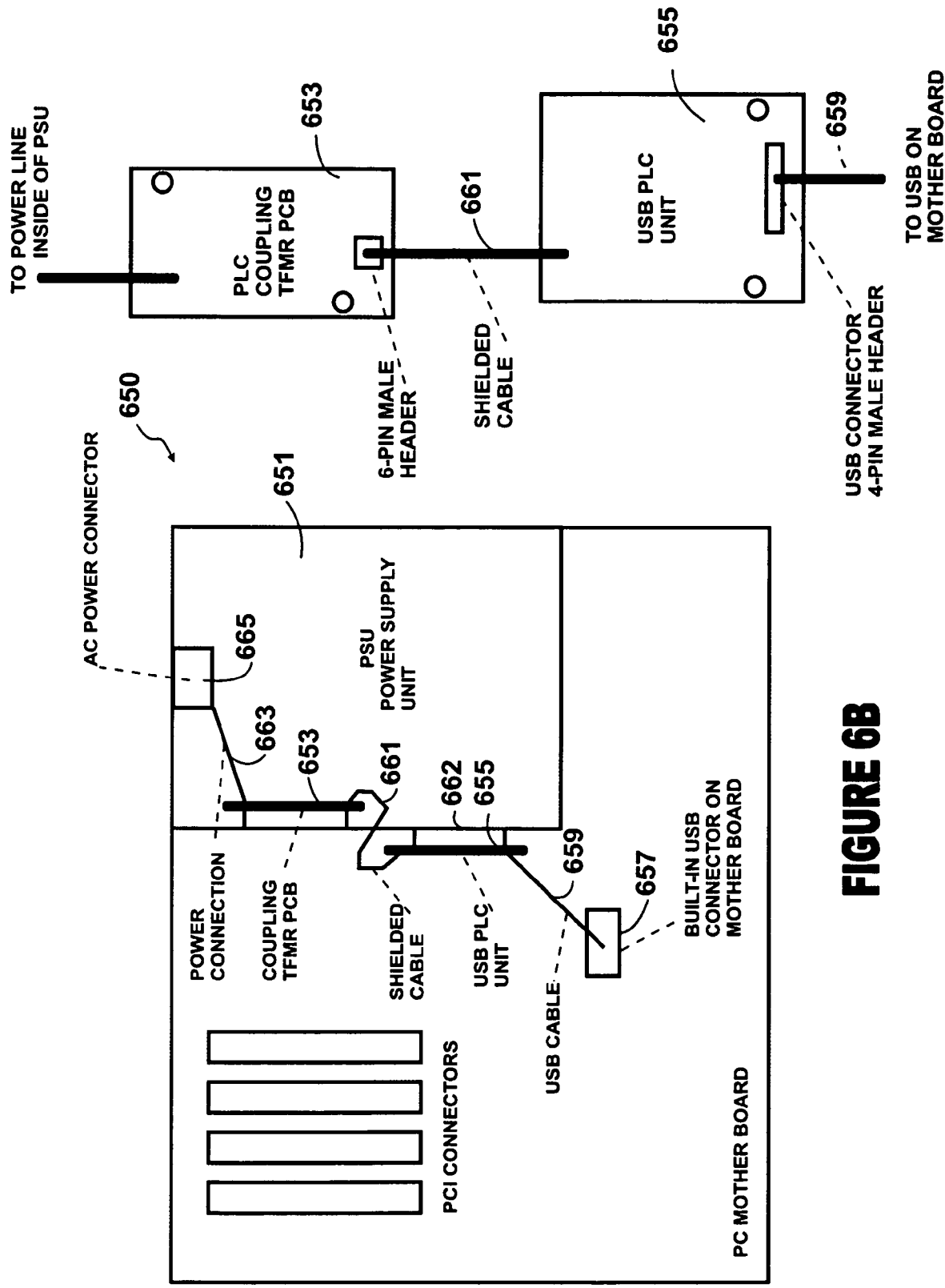
FIG. 6B is a simplified diagram of a coupling board and digital board in a power supply according to an embodiment of the present invention.

FIG. 6B is a simplified diagram of a coupling board and digital board in a power supply according to an embodiment of the present invention. As shown, the diagram includes a mother board 605 with various elements according to an embodiment of the present invention. The mother board includes PCI connections and power supply apparatus 651. The power supply apparatus includes a coupling board 653 and a digital power supply module board 655. As shown, the coupling board and the power supply board are separated by housing member 662, which is often a metal material for shielding and support purposes, according to an embodiment of the present invention. A shield cable 661, which is flexible, connects the two boards together according to a specific embodiment. The digital board derives power and a telecommunication signal via USB cable 659, which couples to the mother board according to an embodiment of the present invention. As also shown, the coupling board provides the powerline signal via power line 663 to AC power connection 665 according to a specific embodiment. Of course, there can be other variations, modifications, and alternatives.

Figure 7:
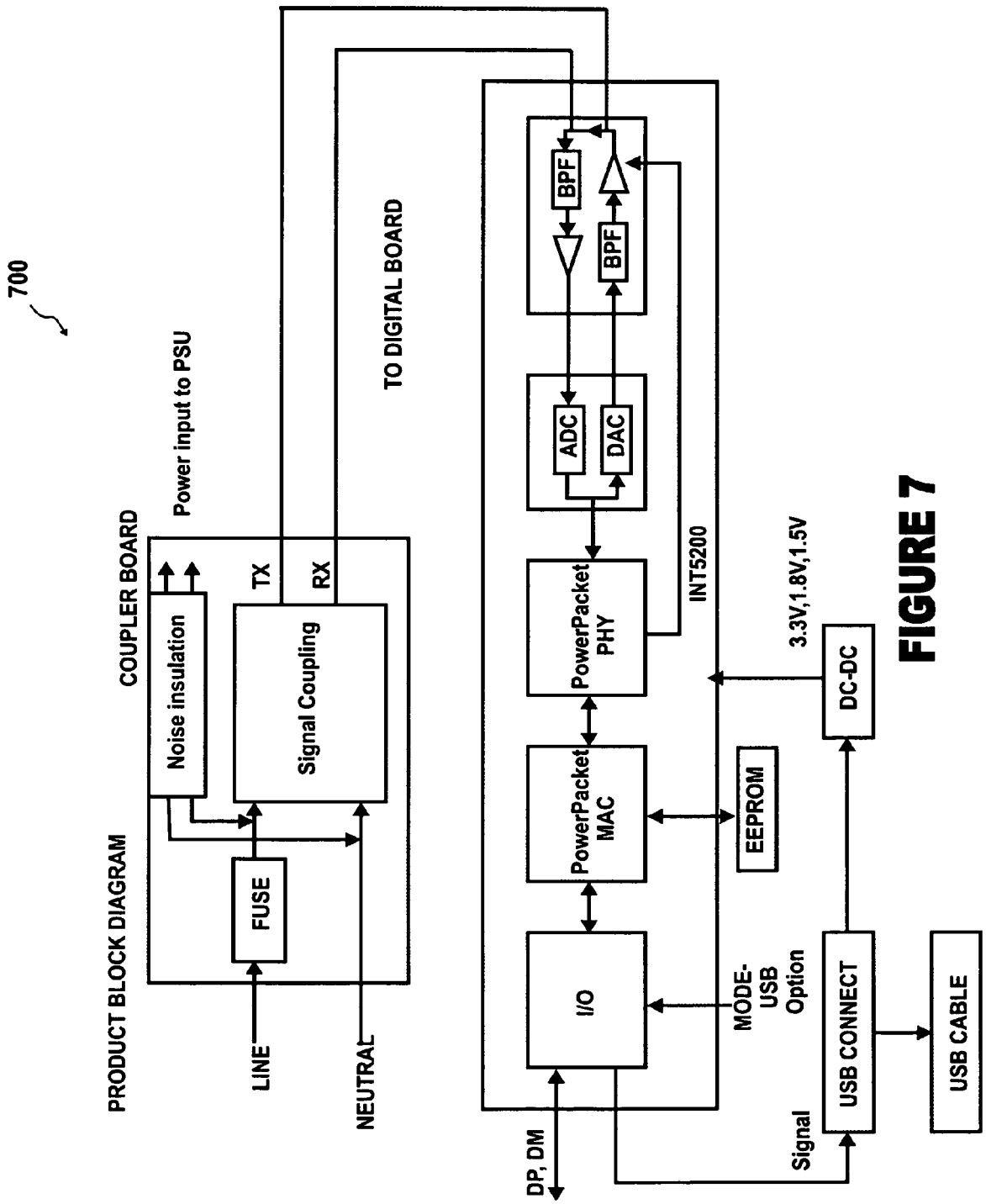
FIG. 7 is a simplified block diagram of the coupling board and the digital power supply module board according to an embodiment of the present invention.

FIG. 7 is a simplified block diagram 700 of the coupling board and the digital power supply module board according to an embodiment of the present invention. This diagram is merely an example, which should not unduly limit the scope of the claims herein. One of ordinary skill in the art would recognize many variations, alternatives, and modifications.

FIG. 8 is a simplified diagram of a cable specification 800 for interfacing the digital board of FIG. 7 to a mother board according to an embodiment of the present invention. This diagram is merely an example, which should not unduly limit the scope of the claims herein. One of ordinary skill in the art would recognize many variations, alternatives, and modifications. In a specific embodiment, the digital board derives power from the USB port inside of the PC motherboard. A USB cable is provided to bring a power and communications link to the digital board from the PC motherboard according to a specific embodiment. As shown is a specification for the USB cable according to a specific embodiment.

Figure 9:
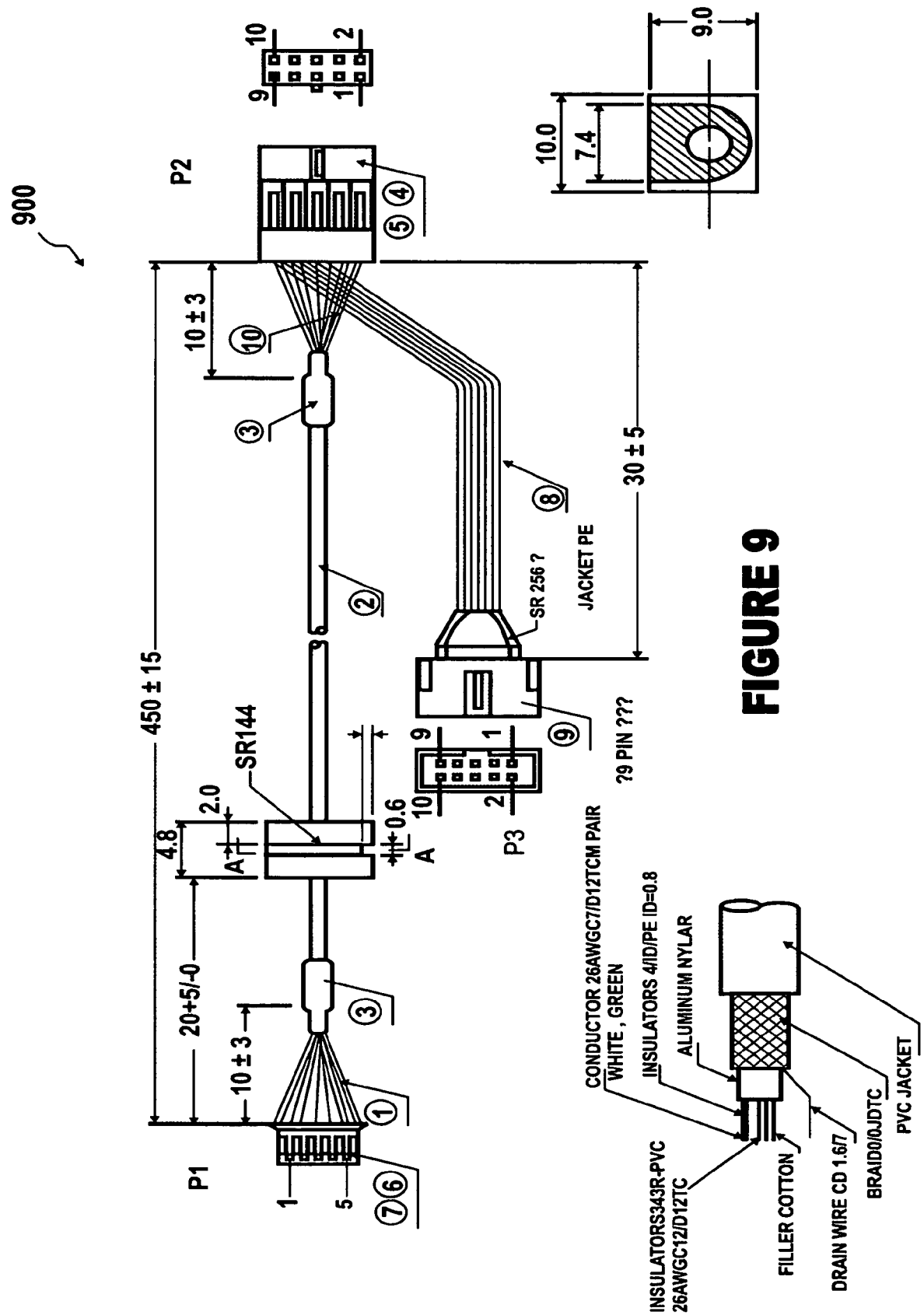
FIG. 9 is a simplified diagram of a power line cable for interfacing between the coupling board and the digital board of FIG. 7 according to an embodiment of the present invention.

FIG. 9 is a simplified diagram of a power line cable 900 for interfacing between the coupling board and the digital board of FIG. 7 according to an embodiment of the present invention. This diagram is merely an example, which should not unduly limit the scope of the claims herein. One of ordinary skill in the art would recognize many variations, alternatives, and modifications. In a specific embodiment, the digital board is connected to the coupling board through a short cable called PLC cable. One end of the PLC cable has a 6-pin female connector, and the other end has 5 exposed wires. The 6-pin female connector will be connected to the coupling board, and whereas the exposed wires will be soldered to the digital board. In a specific embodiment, the power line cable 900 is illustrated.

Figure 10:
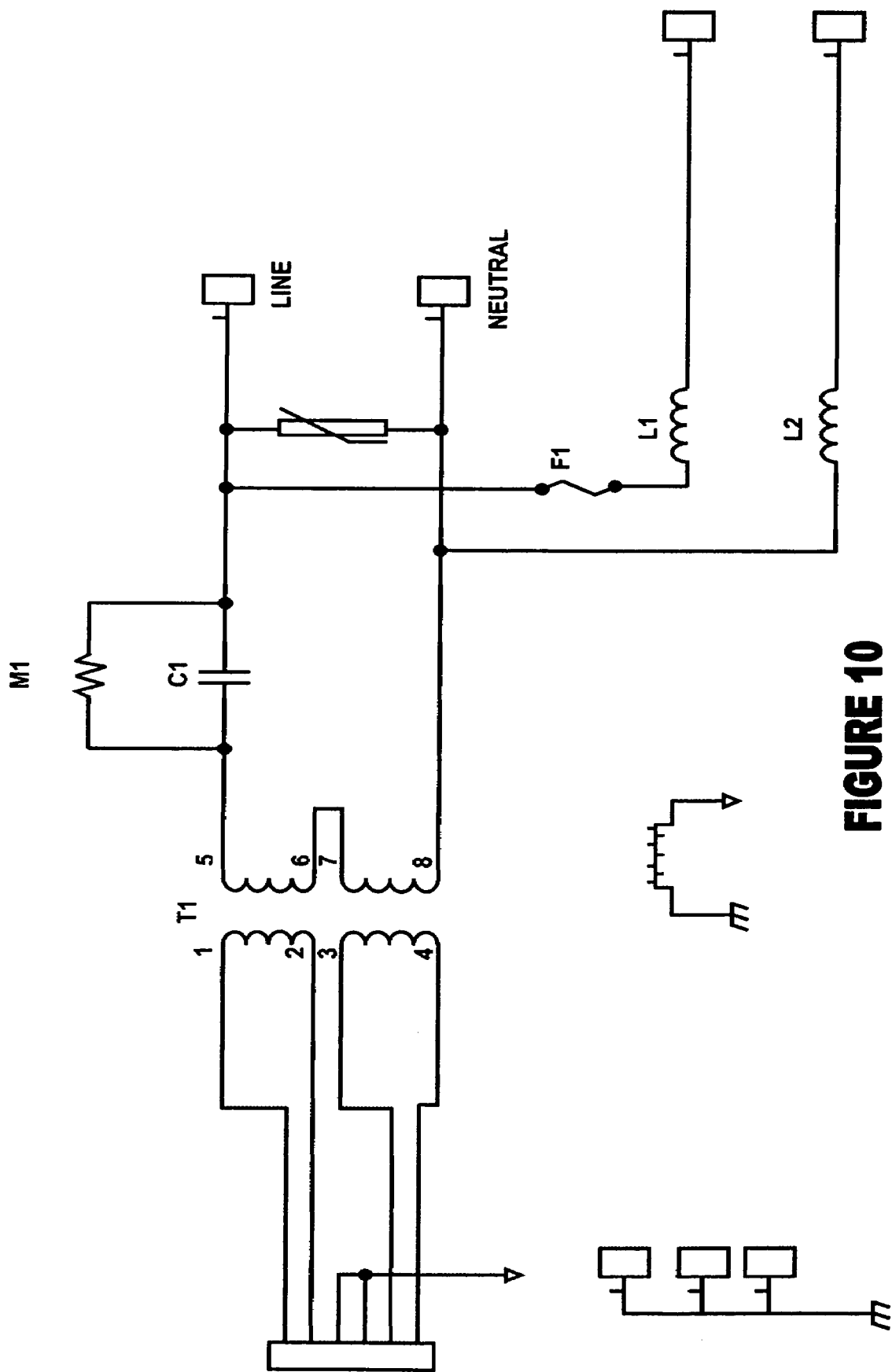
FIG. 10 is a simplified diagram of a coupling device according to an embodiment of the present invention.

FIG. 10 is a simplified diagram of a coupling device according to an embodiment of the present invention. This diagram is merely an example, which should not unduly limit the scope of the claims herein. One of ordinary skill in the art would recognize many variations, alternatives, and modifications. In a specific embodiment, the coupling device is provided on the coupling board. Of course, there can be other variations, modifications, and alternatives.

In a specific embodiment, we have prepared certain specifications for the present apparatus and method. As merely an example, which should not unduly limit the scope of the claims herein, we have provided the following specifications:

Power Line Digital Board and Coupler Specification

| | |
|---|---|
| Chipset | Intellon INT5200 |
| Standard | HomePlug 1.0 |
| Interface | USB 1.1 |
| Modulation | OFDM |
| Frequency Band | 4~21 MHz |
| PLC Data Rate | Up to 14 Mbps |
| Encryption | 56-bit DES |
| OS Compatibility | Windows ® 98 SE |
| | Windows ME |
| | Windows 2000 |
| | Windows XP |
| Power Input | +5VDC USB-Bus Powered |
| Power Consumption | <2.5 W |
| Safety & EMI Compliance | FCC, CE, UL, cUL |
| Temperature Operating Range | 32° F. to 113° F. (0° C. to 45° C.) |
| Temperature Storage Range | −4° F. to 158° F. (−20° C. to 70° C.) |
| Humidity Range | 10% to 85% Non-condensing |
| Humidity Storage | 5% to 90% Non-condensing |

Switching Power Supply Specifications

| | | |
|---|---|---|
| Remote ON/OFF Control | | |
| Power Input | | 220 VAC-230 VAC |
| | | 4 A, 50-60 Hz |
| Output Power | | 315 W Max |
| DC Output: | +3.3 V | 15.0 A |
| | +5 V | 25.0 A |
| | +5 Vsb(stand by) | 2.0 A |
| | +12 V (#1) | 11.0 A |
| | +12 V (#2) | 11.0 A |
| | −12 V | 0.4 A |
| Over current protection | | |
| Over voltage protection | | +5 V, +3.3 V, +12 V |
| Temperature Operating Range | | 0° C. to 50° C. |
| Temperature Storage Range | | −20° C. to 65° C. |
| Temperature Operating Range | | 0° C. to 50° C. |
| Humidity Range | | 10% to 85% Non-condensing |
| Humidity Storage | | 5% to 90% Non-condensing |
| High Efficiency | | up to 80% |
| Weight | | 5 lbs |

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A power supply apparatus, the power supply apparatus comprising:
   an AC input for voltage ranging from about 100 volts to 240 volts and a frequency of 50 to about 60 Hertz;
   a converter for converting AC power into DC power, the converter comprising an input and an output; the input of the converter being coupled to the AC input;
   a DC output for voltage ranging from about a first determined amount to about a second determined amount, the output of the converter being coupled to the DC output;
   a fan operably configured to transfer thermal energy away from the converter;
   a data input/output port, the data input/output port being coupled to a data signal from a data source;
   a coupler coupled between the data input/output port and the AC input;
   a power line module coupled to the coupler, the power line module being adapted to convert the data signal from a first format to a second format, the second format being capable of transmission to the AC input; and
   an enclosure provided for the coupler, the enclosure being made of metal material to shield high frequency noise, the enclosure being adapted to shield the data signal.

2. The power supply apparatus of claim 1 wherein the enclosure comprises a metal material, the metal material substantially shielding any high frequency electromagnetic noise ranging from 500 kilo-Hertz to 1 Mega-Hertz to the coupler.

3. The power supply apparatus of claim 1 wherein the enclosure comprises a metal material to shield high frequency noise at a frequency ranging from 1 Mega Hertz to about 30 Mega Hertz, the high frequency noise being derived from the converter including a switching power supply.

4. The power supply apparatus of claim 1 wherein the apparatus is provided entirely within a docking station.

5. The power supply apparatus of claim 1 wherein the apparatus is provided within a personal computer device.

6. The power supply apparatus of claim 1 wherein the power supply apparatus further comprising an enclosure, the enclosure housing the fan, converter, coupler and power line module.

7. The power supply apparatus of claim 1 wherein the power line module is provided on a first board and the coupler is provided on a second board, the first board being separated by a spatial distance from the second board.

8. The power supply apparatus of claim 1 wherein the fan comprises a plurality of blades being operable using a motor.

9. The power supply apparatus of claim 1 wherein the AC input is coupled to a power line network.

10. The power supply apparatus of claim 1 wherein the data signal in the first format is an OFDM format.

11. The power supply apparatus of claim 1 wherein the power line module comprises a power line chip.

12. The power supply apparatus of claim 1 wherein the power line module comprises a power line chip coupled to an analog front end.

13. The power supply apparatus of claim 1 wherein the power line module is coupled to a USB port, the USB port providing electrical power to the power line module.

14. The power supply apparatus of claim 1 wherein the data input/output port is a USB port.

15. A personal computing apparatus comprising:
   a personal computer housing, the personal computer housing coupled to an AC input interface and a data input/output interface;
   a power supply apparatus within the personal computer housing, the power supply apparatus comprising:
   an AC input coupled to the AC input interface, the AC input for voltage ranging from 100 volts to 240 volts;
   a converter for converting AC power into DC power, the converter comprising an input and an output; the input of the converter being coupled to the AC input;
   a DC output for voltage ranging from about a first determined amount to a second determined amount, the output of the converter being coupled to the DC output;
   a fan operably configured to transfer thermal energy away from the converter;
   a data input/output interface, the data input/output interface being coupled to the data input/output interface, the data input/output interface being coupled to a data signal in a first format from a data source;
   a coupler coupled between the data input/output port and the AC input;
   a power line module coupled to the coupler, the power line module being adapted to convert the data signal from the first format to a second format, the second format being capable of transmission to the AC input interface; and
   an enclosure provided for the coupler, the enclosure being made of metal material to shield high frequency noise, the enclosure being adapted to shield the data signal.

16. The personal computing apparatus of claim 1 wherein the enclosure comprises a metal material, the metal material substantially shielding any high frequency electromagnetic noise ranging from 500 kilo-Hertz to 1 Mega Hertz to the coupler.

17. The personal computing apparatus of claim 15 wherein the converter is a source for high frequency noise ranging from 1 Mega-Hertz to 30 Mega Hertz.

18. The personal computing apparatus of claim 15 wherein the power supply apparatus further comprising a power supply enclosure, the power supply enclosure housing the fan, converter, coupler and power line module.

19. The personal computing apparatus of claim 15 wherein the power line module is provided on a first board and the coupler is provided on a second board, the first board being separated by a spatial distance from the second board.

20. The personal computing apparatus of claim 15 wherein the fan comprises a plurality of blades being operable using a motor.

21. The personal computing apparatus of claim 15 wherein the AC input interface is coupled to a power line network.

22. The personal computing apparatus of claim 15 wherein the data signal in the second format is an OFDM format.

23. The personal computing apparatus of claim 15 wherein the power line module comprises a power line chip.

24. The personal computing apparatus of claim 15 wherein the power line module comprises a power line chip coupled to an analog front end.

25. The personal computing apparatus of claim 15 wherein the power line module is coupled to a USB port, the USB port providing electrical power to the power line module.

26. The personal computing apparatus of claim 15 wherein the data input/output port is a USB port.

27. The personal computing apparatus of claim 15 wherein the first determined amount is 12 volts and the second determined amount is 3.3 volts.

28. A power supply apparatus, the power supply apparatus comprising:
   an AC input for voltage;
   a converter for converting AC power into DC power, the converter comprising an input and an output; the input of the converter being coupled to the AC input;

a DC output for voltage ranging from a first determined amount to a second determined amount, the output of the converter being coupled to the DC output;

a data input/output port, the data input/output port being coupled to a data signal from a data source;

a coupler coupled between the data input/output port and the AC input;

a housing member coupled to the coupler, the housing member having a first side and a second side, the second side being coupled to the coupler;

a power line module coupled to the coupler, the power line module being provided on the first side of the housing member, the power line module being adapted to convert the data signal from a first format to a second format, the second format being capable of transmission to the AC input, the power line module being separated by the coupler by the housing member; and an enclosure provided for the power line module, the enclosure being made of metal material to shield high frequency noise, the enclosure being provided to shield the power line module from a high frequency noise.

29. The power supply apparatus of claim 28 wherein the power line module and the coupler are connected using a flexible cable of less than three inches.

30. The power supply apparatus of claim 28 wherein the power line module is coupled to the data source using a serial bus.

31. The power supply apparatus of claim 30 wherein the power line module derives electrical power from the serial bus.

32. The power supply apparatus of claim 31 wherein the serial bus is a USB format.

33. A method for powerline communications using a power supply module comprising:

providing a powerline signal in a first format from an input/output port;

converting the powerline signal in the first format to a second format using a power line module coupled to a first side of a housing member;

transferring the powerline signal in the second format through a portion of the housing member using a flexible cable; and coupling the powerline signal in the second format to an AC powerline using a coupling device coupled to a second side of the housing member, the coupling device positioned in an enclosure, the enclosure being made of metal material to shield high frequency noise.

34. A power supply apparatus, the power supply apparatus comprising:

an AC input for voltage ranging from 100 volts to 240 volts and a frequency of about 50 to about 60 Hertz;

a converter for converting AC power into DC power, the converter comprising an input and an output; the input of the converter being coupled to the AC input;

a DC output for voltage ranging from about a first determined amount to about a second determined amount, the output of the converter being coupled to the DC output;

a fan operably configured to transfer thermal energy away from the converter;

a data input/output port, the data input/output port being coupled to a data signal from a data source;

a coupler coupled between the data input/output port and the AC input;

a noise isolator coupled to the coupler and the data input/output port, the noise isolator being adopted to filter at least noise from the converter;

a shielded cable;

a power line module coupled to the coupler through the shield cable, the power line module being adapted to convert the data signal from a first format to a second format, the second format being capable of transmission to the AC input; and an enclosure provided for the coupler and the noise isolate isolator, the enclosure being made of metal material to shield high frequency noise, the enclosure being adapted to shield the data signal.

35. The power supply apparatus of claim 34 further comprising a fuse coupled to the coupler.

* * * * *